United States Patent [19]

Wetekamp

[11] Patent Number: 5,737,232

[45] Date of Patent: Apr. 7, 1998

[54] POWER SUPPLY ARRANGEMENT FOR A CONTROL CIRCUIT

[75] Inventor: Robert L. Wetekamp, Galesburg, Ill.

[73] Assignee: Maytag Corporation, Newton, Iowa

[21] Appl. No.: 794,445

[22] Filed: Feb. 4, 1997

[51] Int. Cl.[6] ........................................ H02J 3/16
[52] U.S. Cl. ............................... 364/483; 364/492
[58] Field of Search ........................ 364/483, 492; 323/364, 369

[56] References Cited

U.S. PATENT DOCUMENTS

| | | |
|---|---|---|
| 3,248,892 | 5/1966 | Sutton et al. |
| 3,512,372 | 5/1970 | Kusuda et al. |
| 3,529,431 | 9/1970 | Kusuda et al. |
| 3,548,609 | 12/1970 | Kusuda et al. |
| 3,578,754 | 5/1971 | Kusuda. |
| 5,269,154 | 12/1993 | Schmidt. |
| 5,360,962 | 11/1994 | Pettit. |

*Primary Examiner*—Ellis B. Ramirez
*Assistant Examiner*—Thomas Peeso
*Attorney, Agent, or Firm*—Everett G. Diederiks, Jr.

[57] ABSTRACT

In an appliance having a nominally required product load and control components for controlling functions not directly related to those of the nominally required product load, the control components operating at voltages which are relatively low in comparison with those utilized by the nominally required product load, a portion of the nominally required product load is connected in series with the control components to serve as a voltage step down circuit whose output corresponds to the relatively low voltages required by the control components. The control components may include those used to operate a refrigerator door ice and water dispenser, and may provide additional accessory functions such as a toggle operated childproof door lock and display or night lighting, while the portion of the nominally required product load carrying circuit used in the power supply may include a heater coil of the type conventionally provided in the area of the dispenser ice chute for preventing moisture condensation on the dispenser surfaces.

26 Claims, 3 Drawing Sheets

POWER SUPPLY ARRANGEMENT FOR A CONTROL CIRCUIT

BACKGROUND OF THE INVENTION

1. Field of the Invention

This invention relates to electronically controlled appliances, and in particular to low voltage power supply arrangements for the electronic controllers in such appliances.

The invention also relates to a control circuit for a refrigerator door ice and water dispenser which eliminates the need for a step-down voltage transformer and high power voltage reducing resistor in a voltage divider network.

2. Description of Related Art

Microprocessor or integrated circuit based control circuits are used in a variety of electrical appliances because of their versatility and low power consumption, for purposes such as displays and lighting, as well to control accessory functions such as ice and water dispensing in a refrigerator.

Most electronic controls of this type utilize components which require voltages that are relatively low compared to the voltages necessary to carry out the primary functions of the appliance. Power is normally distributed at significantly higher voltage levels than those ranges at which control components operate, with the supply voltage being reduced using transformers or voltage divider circuits. While conventional voltage reduction arrangements perform satisfactorily, the additional transformers or other components necessary to reduce the voltage can add significant costs to the product in which they are used, and inherently result in additional power dissipation with its corollary problems of energy wastage and heat generation.

An example of a conventional control circuit arrangement is illustrated in FIG. 1, which schematically shows an appliance having a nominally required product load 1, such as the compressor, defrost coil heater and fan motor in a refrigerator, which operates at a power distribution voltage supplied by a power grid or other power source 2. Nominally required product load 1 includes various control components such as thermostats, timers, and feedback arrangements which may operate at lower voltages but which are considered to be part of the nominally required product load.

The control circuits with which the present invention is concerned are represented in FIG. 1 by control components 3. These control circuits can include, but are not limited to, a microprocessor-based circuit for operating accessory devices 4 such as an ice and water dispenser in the door of a refrigerator, together with associated lighting and interlocks. Because none of the components in the accessory circuit requires voltages approaching those used by the nominally required product load, and many of the components may be damaged by higher voltages, a voltage step-down circuit 5 is placed between the control components and the primary power source. It is this voltage step-down circuit, which could be in the form of a transformer or resistive components of a voltage divider network, that the present invention is intended to eliminate.

The term "control components" as used herein is to be distinguished from circuitry used to control nominal functions of the appliance, such as the compressor or defrost heater in a refrigerator. One type of control, for example, is placed in series with the defrost coil and thus is responsive to changes in defrost coil resistance which indicate the amount of frost on the coil and therefore are used to switch the defrost coil on and off. Examples of this type of control are found in U.S. Pat. Nos. 3,512,372, 3,529,431, 3,548,609, 3,578,754, and 3,890,798. While the control components thus operate at a lower voltage than that required by the nominal product load, i.e., the defrost coil, they are easily distinguished from the type of circuitry represented by control components 3 on the basis that the input series reduced voltage is variable, and in fact all such circuits require the addition of a fixed power supply such as a battery or a voltage step-down circuit and regulator.

The present invention is also to be distinguished from transformer-less arrangements which substitute a passive voltage divider network for a step-down transformer, an example of which is disclosed in U.S. Pat. No. 5,360,962. While the elimination of a transformer in favor of passive resistive components can decrease power losses, as indicated in the '962 patent, the additional resistive components will inherently waste power and can also add significantly to the product cost. This type of circuit is in any case suitable only for the main power supply and not as a step-down circuit for supplying a constant low voltage to control components of the type with which the present invention is concerned.

In contrast to the voltage divider circuit disclosed in the '962 patent, or the more conventional transformer/voltage divider arrangement disclosed, for example, in U.S. Pat. No. 3,248,892, the present invention provides a power supply circuit suitable for use with components such as a microprocessor requiring a stable, low voltage power source while nevertheless eliminating the transformer and a substantial portion of the voltage divider circuitry required by previous low voltage accessory power supply arrangements.

The invention achieves this end by positioning the normally required product load in series with the control components to enable only the required low voltage to be supplied to the control components. In the field of refrigerator door dispensers, the heater normally provided adjacent the ice chute in a refrigerator door dispenser for the purpose of preventing condensation on surfaces of the dispenser, an example of which is disclosed in U.S. Pat. No. 4,261,179, could be used to perform the step-down function. While the heater circuit used by a preferred implementation of the present invention is entirely conventional, its connection to the microprocessor based dispenser control components is not.

SUMMARY OF THE INVENTION

Accordingly, a first objective of the invention is to provide an appliance having a nominally required product load and control components requiring stable, relatively low voltages with a low voltage power supply circuit that eliminates the need for a transformer while minimizing the need for additional voltage divider components.

In addition, a second objective of the invention to provide an appliance having a nominally required product load and otherwise independent accessory control components requiring stable, relatively low voltages with a low voltage power supply circuit that utilizes a portion of the nominally required load carrying circuitry to provide the step-down function.

A third objective of the invention is to provide a voltage step-down circuit for an appliance of the type having a nominally required product load and otherwise independent accessory control components requiring stable, relatively low voltages with a low voltage power supply circuit made up of a portion of the nominally required product load carrying circuit.

A fourth objective of the invention is to provide a refrigerator having an accessory control circuit which does not require a step-down transformer and which utilizes a portion of the nominally required circuitry of the refrigerator to provide the step-down function.

A fifth objective of the invention is to provide a refrigerator door fountain control power supply circuit which overcomes the shortcomings of prior user control power supplies by utilizing nominally required, or otherwise present, loads to accomplish required voltage reductions to control component levels.

These objectives are accomplished, in accordance with a first preferred embodiment of the invention, by connecting the control components in series with a portion of a nominally required product load carrying circuit in order to utilize the product load as the sole source of power for the control circuitry. In an especially advantageous implementation of this embodiment, the control components are those used to control a refrigerator door ice and water dispenser, including lighting functions and various accessory functions such as a toggle operated childproof door lock and display lighting, and the nominally required product load carrying circuit is the heater circuit conventionally provided in the area of the dispenser ice chute for preventing moisture condensation on the dispenser surfaces.

DETAILED DESCRIPTION OF THE PREFERRED EMBODIMENTS

Figure 2:
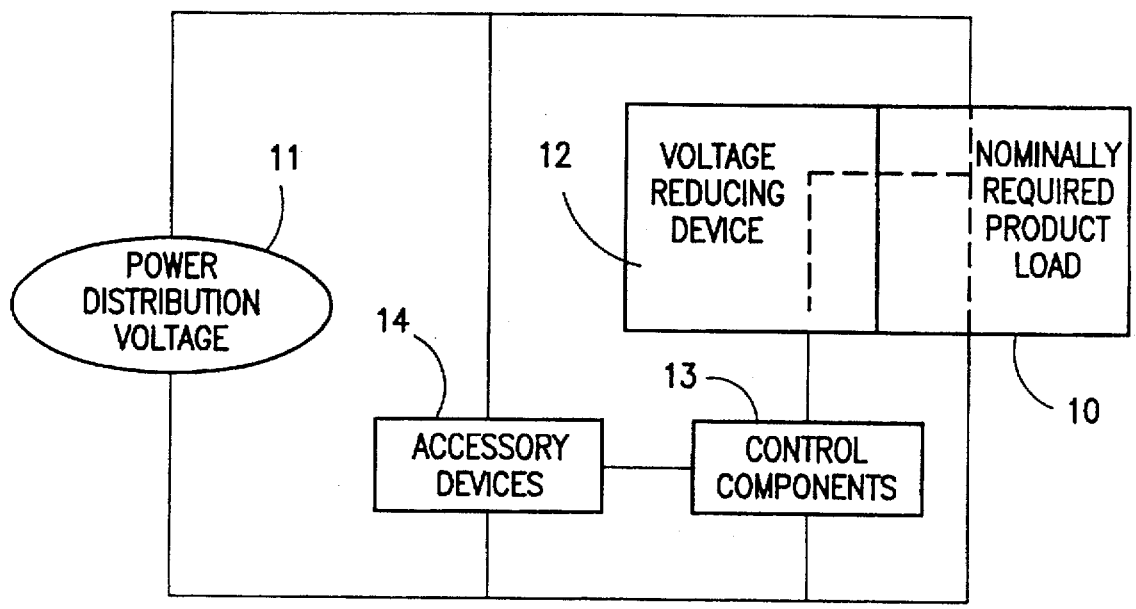
FIG. 2 is a functional block diagram illustrating the basic principle of the preferred embodiment of the invention.

As illustrated in FIG. 2, the invention is applied to an appliance having a nominally required product load 10 supplied with voltages by a conventional power supply 11 at levels which exceed those that can be used to power a control circuit, and which therefore needs to be stepped down in order to provide a stable low voltage to the control components. The nominally required product load 10 includes at least one device or circuit 12 which consumes a substantial portion of the power supplied to it, such as a heater coil.

Figure 1:
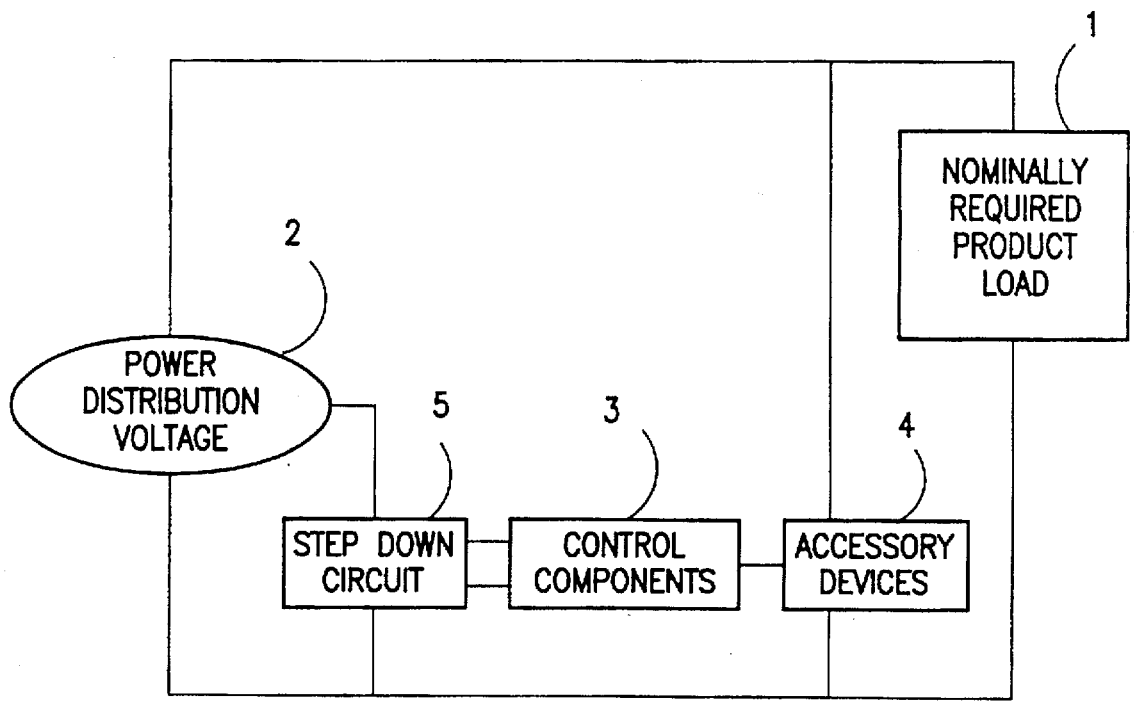
FIG. 1 is a functional block diagram illustrating a conventional arrangement for supplying power to an accessory control system.

Also included in the appliance illustrated in FIG. 2 is the control circuit 13 requiring a relatively low voltage input and which is used to control various accessories 14. As indicated in FIG. 1, such a control circuit would be supplied with power through a step-down transformer or voltage divider circuit. Control circuit 13 is, in accordance with the principles of the preferred embodiment of the invention, connected in series with the device or circuit 12 such that the device or circuit 12 serves to reduce the nominal supply voltage to a level which can be utilized to power the control circuit 13.

In its broadest form, the invention can be applied to any appliance having a nominally required product load that operates at a relatively high voltage and a control circuit that functions independently of the nominally required product load and that operates at a relatively low voltage. While a particular implementation of the preferred embodiment of the invention will now be described, it should be appreciated by those skilled in the art that it may be possible to extend the principles of the invention to appliances other than the illustrated refrigerator, having control circuits other than the illustrated refrigerator door ice and water dispenser control shown in FIGS. 3 and 4. At the very least, those skilled in the art should appreciate that details of the illustrated control circuit may be implemented in a variety of ways without departing from the scope of the invention.

Figure 3:
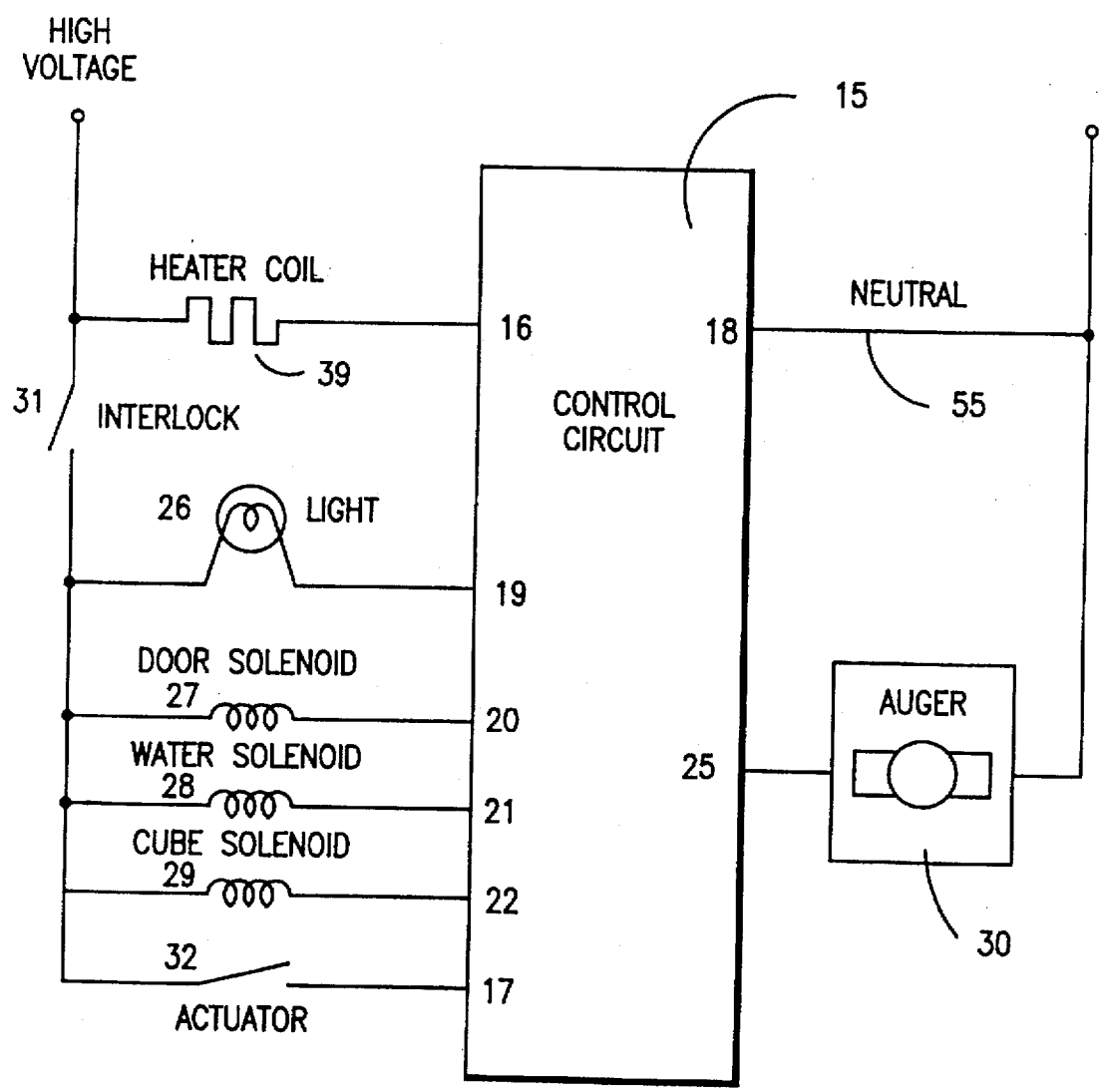
FIG. 3 is a schematic diagram showing an implementation of the preferred embodiment illustrated in FIG. 2.
Figure 4:
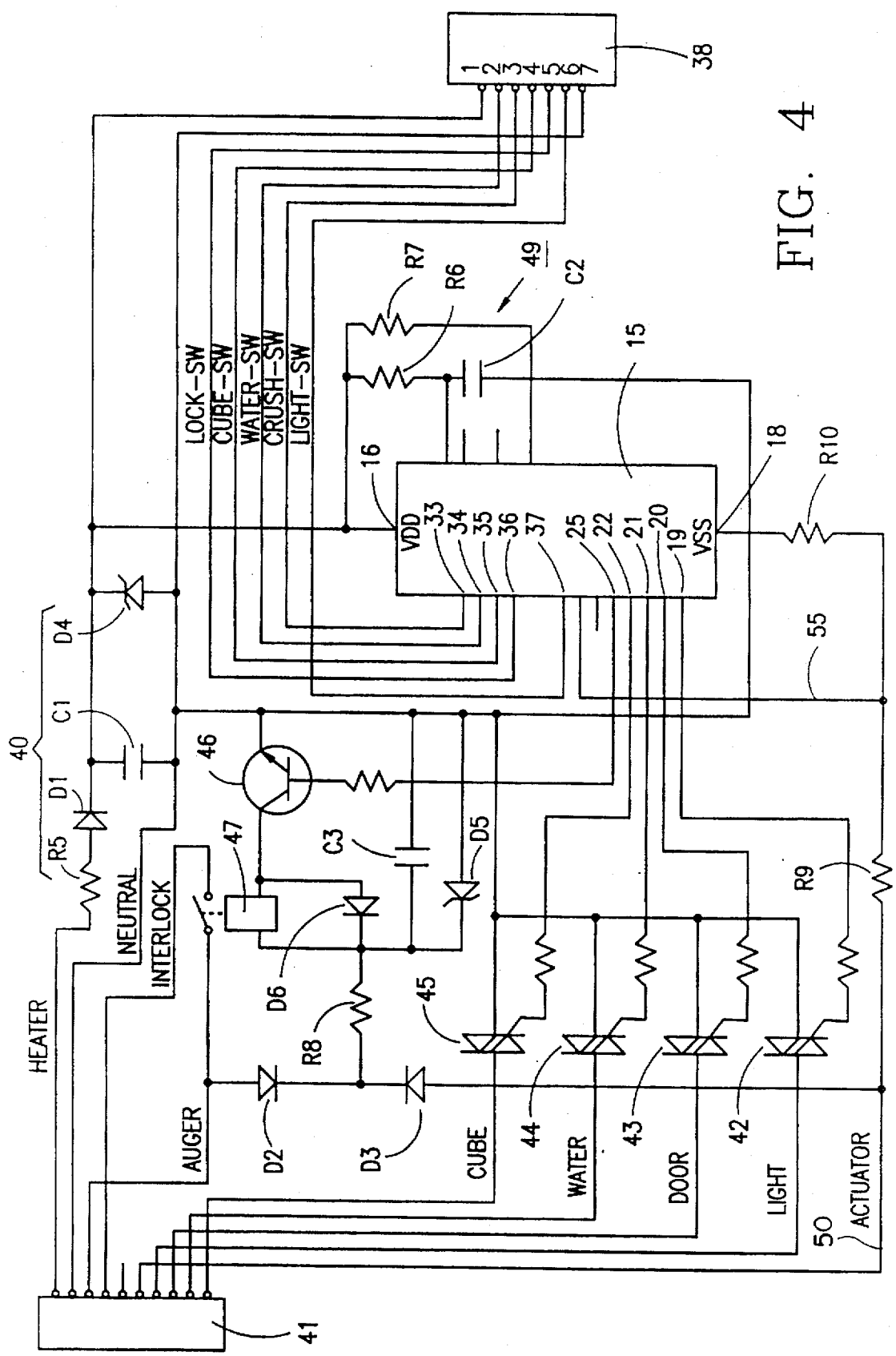
FIG. 4 is a more detailed schematic circuit diagram of the implementation illustrated in FIG. 2.

With reference to FIGS. 3 and 4, a specific control circuit 13 to which the principles of the invention may be applied is a microprocessor based controller for a refrigerator door ice and water dispenser. Controller 13 includes, in the illustrated implementation, a microprocessor 15 having timer and memory functions, a low voltage input terminal 16, an actuator switch input terminal 17, a ground connection 18, and respective low voltage output terminals 19–22 and 25 for activating a dispenser light 26, a childproof door lock solenoid 27, water and cube dispenser solenoids 28 and 29, and an auger motor 30 for supplying crushed rather than cubed ice. A mechanical interlock 31 ensures that the controller is not operated when the refrigerator door is open, while the switch input terminal 17 is connected to a user operated main switch 32. Shown only in FIG. 4 are the low voltage connections between terminals 33–37 and individual user operated switches (not shown) for the locking, ice cube dispensing, water dispensing, crushed ice dispensing, and light functions, each of which is connected through a jumper connector 38 to an LED indicator light that illuminates when the corresponding switch is turned on to initiate a function.

Power to the microprocessor controller is supplied solely through low voltage input terminal 16 from a heater coil 39 (a two watt heater coil in the preferred embodiment) situated in the refrigerator door adjacent the dispenser and which is used to prevent condensation from forming on the outside of the dispenser. It will be appreciated by those skilled in the art that both the microprocessor controller and the heater coil are conventional, and that it is the connection between the controller and the heater coil that represents the invention in this implementation.

Between the heater coil 39 and low voltage input terminal 16 is a low voltage stabilization circuit 40 made up of a resistor R5, capacitor C1, diode D1, and zener diode D4. Actually, capacitor C1 and resistor R5 collectively define a low pass filter of low voltage stabilization circuit 40. The output of this voltage stabilization circuit is supplied to input terminal 16 and also jumper 38 to complete the LED indicator light circuits, while the input side of the heater coil is connected to the nominal high voltage input, which in the implementation illustrated in FIG. 4 is a jumper connector 41 to a circuit board on which the circuit elements illustrated in FIG. 4 are mounted.

Control of the ice cube dispensing, water dispensing, door locking, and dispenser light functions is by means of respective triacs 42–45 whose control inputs are connected to microprocessor outputs 19–22, while the auger motor 30 is controlled by a transistor 46 whose control electrode is connected to microprocessor output 23. Triacs 42–45 and microprocessor output 23 isolate the microprocessor from the higher operating voltages of the respective dispenser and locking solenoids and the dispenser light, which illuminates the dispenser during a dispensing operation in response to activation of any of a plurality of manually actuated switches connected via terminals 33–36 and jumper connector 38 for initiating the respective functions of the dispenser, and which can be left continuously on to serve as a night light by operating the switch connected to terminal 37.

The crushed ice auger control transistor 46 is connected via a relay 47 to the auger control circuit, the relay being supplied with power via diode D2 and resistor R8, and further controlled by a connection to microprocessor timer output circuit 49 via resistors R6 and R7, capacitors C2 and C3, diode D6, and zener diode D5 for preventing operation of the auger until after a time delay while isolating the microprocessor from the high voltage side of the relay. The respective ice cube dispensing, water dispensing, door locking, and lighting circuits are completed by an actuator line 50 connected to the high voltage jumper connector 41. Although only shown in FIG. 3, this actuator connection line 50 is provided with switch 32. Actuator connection line 50 is further connected to relay 47 via diode D3, and to the neutral line 55 via a voltage resistor R9. Finally, ground terminal 18 is connected to the neutral line via low voltage resistor R10.

It will be appreciated that while a specific circuit for providing various refrigerator door ice and water dispenser control functions has been described in detail, additional functions could be added without departing from the basic principle of the invention, which is to supply power to the microprocessor via a series connection with a portion of the nominally required product load circuitry having suitable power dissipation properties, and in particular with a condensation prevention heater situated in the refrigerator door adjacent the dispenser. The additional functions for the illustrated dispenser controller could include, for example, functions such as a door-ajar alarm, button reconfiguration options, or an adaptive defrost sensor and controller circuit which takes into account the number of door openings and/or ambient conditions.

Having thus described a preferred embodiment of the invention in sufficient detail to enable those skilled in the art to make and use the invention, it is nevertheless intended that the above description not be taken as limiting, but rather that the invention be defined solely by the appended claims.

I claim:

1. In an appliance, comprising:

a nominally required product load and independent control components requiring stable, relatively low voltages in comparison with those used by the nominally required product load, said nominally required product load including a resistive portion which produces a voltage drop corresponding to a difference between said relatively high and relatively low voltages, the improvement wherein:

said control components are connected in series with said resistive portion of the nominally required product load, whereby said portion of the nominally required product load serves to reduce supplied power voltages to control component voltages.

2. An appliance as claimed in claim 1, wherein the control components include a microprocessor.

3. An appliance as claimed in claim 2, further comprising voltage stabilization circuitry connected between the portion of the nominally required load and the microprocessor.

4. An appliance as claimed in claim 3, wherein said voltage stabilization circuitry includes a low pass filter and a diode.

5. An appliance as claimed in claim 1, wherein said control components constitute a controller for a refrigerator door ice and water dispenser.

6. An appliance as claimed in claim 5, wherein said resistive portion of the nominally required load includes a heater coil arranged to prevent condensation from forming on the ice and water dispenser unit.

7. An appliance as claimed in claim 6, wherein the controller is a microprocessor, and said heater coil supplies a low voltage to a low voltage input terminal of the microprocessor.

8. An appliance as claimed in claim 7, further comprising voltage stabilization circuitry connected between the heater coil and the microprocessor.

9. An appliance as claimed in claim 8, wherein said voltage stabilization circuitry includes a low pass filter and a diode.

10. An appliance as claimed in claim 7, wherein said microprocessor includes output terminals connected to control inputs of circuit components for operating at least an ice dispenser, a water dispenser and a crushed ice auger motor.

11. An appliance as claimed in claim 10, wherein said circuit components include a plurality of triacs for the ice and water dispensers, as well as a transistor controlled relay circuit for the auger motor.

12. An appliance as claimed in claim 11, further comprising a door interlock connected to high voltage sides of the circuit components.

13. An appliance as claimed in claim 11, further comprising manually operated switches connected between the heater coil and inputs of the microprocessor.

14. A low voltage power supply for accessory function control components requiring stable relatively low voltages in comparison with relatively high voltages used by a nominally required product load, comprising:

a resistive portion of the nominally required load which produces a voltage drop corresponding to a difference between said relatively high and relatively low voltages; and a series connection between the control components and said resistive portion of the nominally required product load, whereby said portion of the nominally required product load serves to reduce supplied power voltages to the relatively low voltages required by the control components.

15. A power supply as claimed in claim 14, wherein the control components include a microprocessor.

16. A power supply as claimed in claim 15, further comprising voltage stabilization circuitry connected between the resistive portion of the nominally required load and the microprocessor.

17. A power supply as claimed in claim 16, wherein said voltage stabilization circuitry includes a low pass filter and a diode.

18. A power supply as claimed in claim 14, wherein said control components constitute a controller for a refrigerator door ice and water dispenser.

19. A power supply as claimed in claim 18, wherein said resistive portion of the nominally required load includes a heater coil arranged to prevent condensation from forming on the ice and water dispenser unit.

20. A power supply as claimed in claim 19, wherein the controller is a microprocessor, and said heater coil supplies a low voltage to a low voltage input terminal of the microprocessor.

21. A power supply as claimed in claim 20, further comprising voltage stabilization circuitry connected between the heater coil and the microprocessor.

22. A power supply as claimed in claim 21, wherein said voltage stabilization circuitry includes a low pass filter and a diode.

23. A power supply as claimed in claim 20, wherein said microprocessor includes output terminals connected to control inputs of circuit components for operating at least an ice dispenser, a water dispenser and a crushed ice auger motor.

24. A power supply as claimed in claim 23, wherein said circuit components include a plurality of triacs for the ice and water dispensers, as well as a transistor controlled relay circuit for the auger motor.

25. A power supply as claimed in claim 24, further comprising a door interlock connected to high voltage sides of the circuit components.

26. A power supply as claimed in claim 24, further comprising manually operated switches connected between the heater coil and inputs of the microprocessor.

* * * * *